Nov. 30, 1971          H. W. MOLZAHN          3,623,304

HYDRAULIC SYSTEM FOR SUPPORTING A HARVESTER PLATFORM

Filed March 30, 1970

INVENTOR
HERBERT W. MOLZAHN
BY Neal C. Johnson
ATT'Y.

United States Patent Office 3,623,304
Patented Nov. 30, 1971

3,623,304
HYDRAULIC SYSTEM FOR SUPPORTING A HARVESTER PLATFORM
Herbert W. Molzahn, Hamilton, Ontario, Canada, assignor to International Harvester Company, Chicago, Ill.
Filed Mar. 30, 1970, Ser. No. 23,646
Int. Cl. A01d 41/06
U.S. Cl. 56—208                                                5 Claims

ABSTRACT OF THE DISCLOSURE

A self-propelled windrower having a wheeled frame and a harvester platform disposed forwardly of the frame for cutting and swathing a crop. The platform is movably mounted on the frame and is floatably supported by a hydraulic system enabling the platform to move upwardly and downwardly in accordance with ground undulations.

BACKGROUND OF THE INVENTION (1) Field of the invention

The invention relates to harvesting machines and more particularly to an improved hydraulic system for floatably supporting a harvester platform from a wheeled frame or chassis of the harvesting machine.

(2) Description of prior art

Harvester platforms for windrowers and the like are customarily suspended from the frame or chassis by means including elongated coil springs. The purpose of the springs is to yieldably support the platform so that it will move vertically in response to changes in the contour of the ground over which the machine is being moved. It is desirable that the platform adjust its vertical position throughout a considerable range of movement so that substantial variations in ground contour may be accommodated. In order to obtain this result, the coil springs are constructed of considerable length. This often requires that the platform be disposed at a considerable distance forwardly of the chassis to accommodate the springs thereby increasing the total length of the machine. A machine of substantial length is cumbersome to operate and difficult to maneuver in areas restricted in size. Moreover, with the platform disposed at substantial distances forwardly of the chassis, the center of gravity of the machine may be disposed sufficiently toward the front thereof to create a tendency of the machine to tip or tilt forwardly during sudden stops or when traveling over uneven ground surfaces. Difficulties may also be presented in designing springs to effectively accommodate platforms of various weights.

The conventional use of coil springs also creates further problems in that the springs are easily excited into a harmonic vibrating condition as the machine is operated. This condition may result in breakage of the connections at the ends of the springs.

In an attempt to overcome the above and other problems, attempts have been made to use hydraulic systems for floatably supporting the platform during a harvesting operation. Typically, such systems may utilize an accumulator in the hydraulic system. The accumulator acts similarly to a spring by maintaining a substantially constant pressure in the hydraulic cylinders which extend and retract in response to movement of the platform. A difficulty with this arrangement occurs when the platform is lowered onto the ground. In this position, the hydraulic fluid will have drained out of the accumulator as soon as the platform has settled on the ground. The pressure in the lift cylinders is then substantially zero and the accumulator is ineffective to support the platform. In order to make the accumulator effective, it is necessary that hydraulic fluid be pumped into the lift cylinders so as to pressurize the accumulator to enable it and the cylinders to sustain the load imposed by the platform. At the same time the pressure must not be so great as to lift the platform from the ground.

In conventional systems the pressurization is accomplished by shifting the control valve into a "lift" position for a very short period of time until the proper pressure is introduced. This step may be difficult to accomplish and requires a high degree of skill on the part of the operator manipulating the control valve. This problem may be decreased somewhat by the use of a pressure gauge, however, this still requires considerable attention and skill of the operator to recharge the hydraulic circuit to a specific pressure level each time the platform has been lowered.

Further attempts to solve the problems have resulted in the incorporation of a relief valve into the platform lift circuit. While the relief valve may eliminate the necessity for a pressure gauge, the operater must nonetheless repressurize the circuit to a level greater than the pressure required to support the platform each time the platform has been lowered. The excess pressure is then bled away through the relief valve until the preset pressure level to support the platform has been obtained.

The use of a relief valve also creates an additional problem. Each time the platform is lowered from its raised position, the fluid from the lift cylinders must escape through the relief valve. This provides a considerable restriction which becomes greater as the system pressure approaches the relief valve setting. Thus, in order to prevent the platform from dropping exceedingly slowly, the relief valve must be set much lower than the pressure required to support the weight of the platform. The result is that in a float position an undesirably large portion of the weight of the platform is supported on the ground.

SUMMARY

The invention provides an improved hydraulic system for moving a harvester platform between a raised transport position and a lowered working position adjacent the ground and for floatably supporting the platform in its working position as the platform moves in response to encountering ground undulations. The invention eliminates the need for conventional coil springs and the attendant problems. Moreover, the invention provides improvements over known hydraulic systems by providing for the automatic pressurization of the lift cylinders to the proper preset level to floatably support the platform in its working position. Consequently, the operator does not have to manipulate the control valve to repressurize the cylinders each time the platform has been lowered to the ground. The need for referring to a pressure gauge is also eliminated. Another advantage provided by the invention is that the platform may be lowered without requiring that the fluid exiting the cylinders be forced through the restriction of a relief valve.

With the foregoing in mind, it is an object of the invention to provide an improved hydraulic system for raising and lowering a harvester platform mounted on a crop harvesting machine.

Another object is to provide an improved hydraulic system which automatically pressurizes the lift cylinders to floatably support a harvester platform in a working position on the ground in response to lowering the platform to its working position.

Still another object is to provide an improved hydraulic system for a harvester platform wherein the position of the platform may be adjusted in a manner requiring a minimum of operator's skill and attention, with the result that a harvesting operation may be conducted quickly and more safely.

DESCRIPTION OF THE PREFERRED EMBODIMENT

Figure 1:
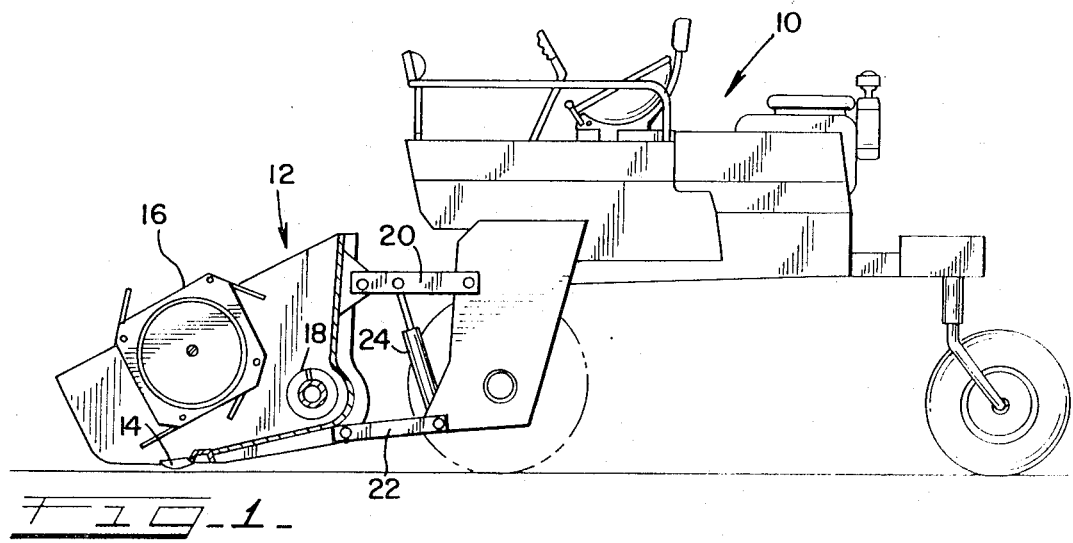
FIG. 1 is a side elevation view partly in cross section of a self-propelled windrower into which the hydraulic system of the invention may be incorporated.

Referring first to FIG. 1, there is shown a self-propelled windrower having a wheel-supported windrower chassis 10 and a harvester platform 12 mounted on the chassis 10 forwardly thereof in the direction of travel of the machine. In accordance with conventional practice the platform 12 includes a cutter assembly 14, a reel 16, and an auger conveyor 18 for cutting and conveying a standing crop into a swath or windrow.

The platform 12 is mounted on the windrower chassis 10 by means including a pair of upper arms 20 and a pair of lower arms 22 (one each of which being shown). The platform 12 is adapted to be moved between a lowered working position and a raised transport position by means including a pair of hydraulic lift cylinders 24, one of which being shown, connected between the chassis 10 and a respective one of the upper arms 20.

Figure 2:
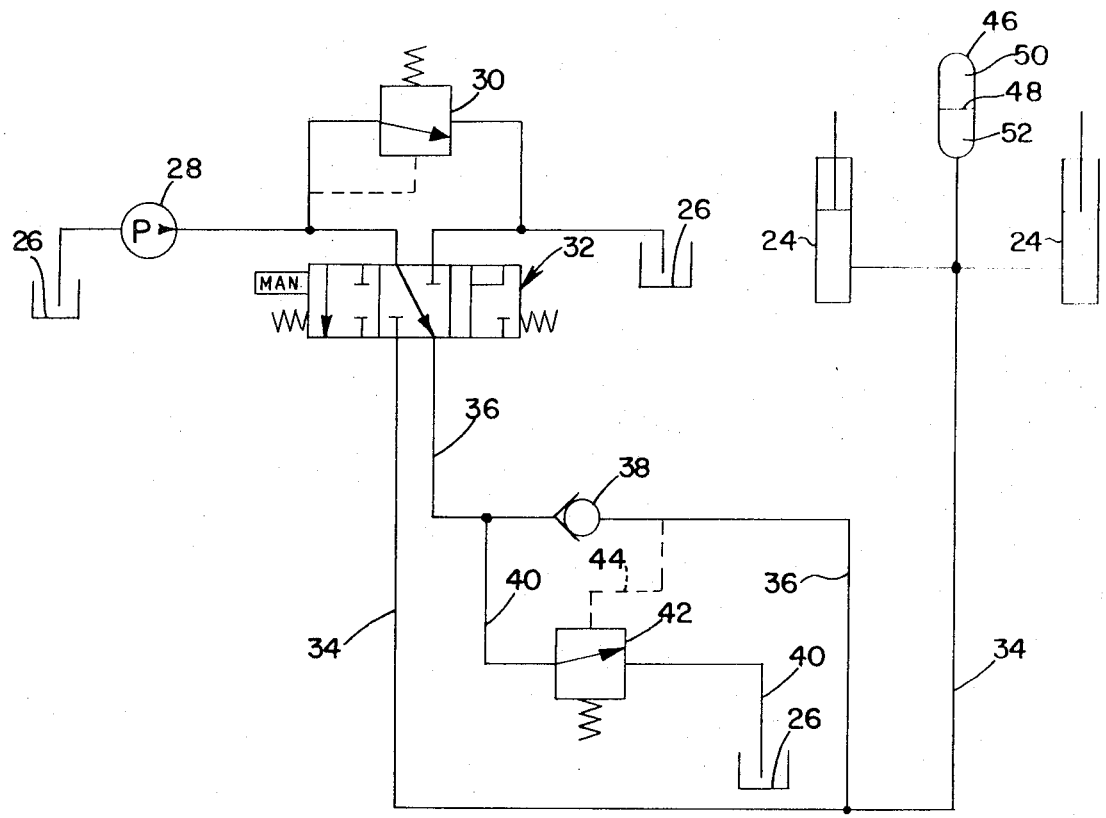
FIG. 2 is a schematic drawing of the hydraulic system of the invention which may be incorporated into the windrower shown in FIG. 1.

In FIG. 2 there is shown the hydraulic system of the invention adapted for raising and lowering the platform 12 and for floatably supporting the platform in a working position. The hydraulic system includes a fluid reservoir 26 to which a pump 28 is operably connected to draw pressure fluid therefrom. A pressure responsive relief valve 30 is connected between the pump 28 and the reservoir 26 for the purpose of relieving excess pressures to thus protect the hydraulic system.

A control valve 32 is operably connected between the output of the pump 28 and the fluid reservoir 26. In the embodiment shown, the control valve 32 comprises a three-position, four-way, manually-operated, spring-centered control valve of conventional construction. The control valve 32 is connected in fluid communication with the lift cylinders 24 in a first circuit by means of a fluid line 34.

It will be seen that the valve 32 includes a first position at the leftmost end of the valve, which when manually shifted into fluid communication with the output of the pump 28, directs pressure fluid into the cylinder units 24 through the line 34. The platform 12 is thus raised to any level above the ground selected by the operator. Valve 32 includes a second position at the rightmost end of the valve, which when shifted into fluid communication with the line 34, permits the fluid in the cylinder units 24 to drain to the reservoir 26 while also directing the pump flow to the reservoir. The weight of the platform 12 thus causes the platform to lower by gravity.

It will be apparent from the foregoing that the fluid line 34 provides a fluid circuit through which the platform 12 may be selectively raised and lowered in response to shifting the control valve 32 to its first and second positions respectively.

It will be seen in FIG. 2 that the valve 32 includes a third position intermediate the first and second positions and into which the valve is spring biased. The hydraulic system of the invention includes a second fluid circuit in fluid communication with the valve 32 when in its third position. The second circuit includes a fluid line 36 in fluid communication between the valve 32 and the fluid line 34 communicating with the cylinder units 24. A one-way check valve 38 is disposed in the line 36 as shown. The second fluid circuit also includes a fluid line 40 in fluid communication between the reservoir 26 and the fluid line 36 upstream of the check valve 38. A pressure responsive unloading valve 42 is disposed in the line 40 and is operative in response to pressure in the line 36 downstream of the check valve 38 by means of a sensing line 44 connected therebetween.

The hydraulic system of the invention includes an accumulator 46 of conventional construction in fluid communication with the cylinder units 24. The accumulator 46 includes an internal flexible membrane 48 dividing the accumulator into first and second chambers 50 and 52 respectively. The chamber 50 contains nitrogen gas under a predetermined pressure and the chamber 52 contains hydraulic fluid in communication with the cylinder units 24. The accumulator 46 functions to accommodate fluid flow into and out of the cylinder units 24 as the pistons thereof move back and forth in response to movement of the platform over ground undulations. The accumulator 46 maintains a substantially constant pressure in the fluid acting against the cylinder units and thus provides a means for floatably supporting the platform.

It will be understood that each of the components of the above described hydraulic system is of conventional construction well known in the art. The hydraulic system will of course be powered by the engine of the machine in which the system is incorporated. The physical location of the various components will be determined in accordance with overall design criteria of the machine. Thus, for example, the control valve 32 is positioned to be actuated through a suitable mechanical linkage (not shown) conveniently accessible to the operator of the machine.

In operation, the control valve 32 is manually shifted to its first or "lift" position to direct pressure fluid from the pump 28 into the cylinder units 24 to thus raise the platform 12. The platform is lowered by shifting the control valve 32 to its second or "down" position which permits the fluid to drain from the cylinder units 24 to the reservoir 26, while also directing the flow of pump fluid to the reservoir.

As the platform 12 is lowered onto the ground, the operator releases the control valve 32 permitting the same to automatically shift to its third or "float" position under the force of the springs biasing the valve to that position. The pump fluid is thus directed into the line 36, past the check valve 38, and into the cylinder units 24 and the chamber 52 of the accumulator 46. When the fluid pressure in the cylinder units and accumulator reaches a predetermined value, the same acts through the line 44 upon the unloading valve 42 to direct the pump fluid into the reservoir 26 through the line 40. The check valve 38 closes to hold the fluid in communication with the cylinder units and the accumulator. It will also be seen that fluid in the line 34 is blocked by the control valve 32 in its third position. Thus, the fluid in the system acting against the cylinder units to support the platform is automatically pressurized to a predetermined value without requiring special skill or attention on the part of the operator.

The predetermined fluid pressure is preferably set at a value which permits the cylinder units to support a substantial portion of the weight of the platform, but wherein the platform is also supported on the ground when the machine is on a level surface as shown in FIG. 1. Accordingly, the platform is capable of moving downwardly to follow depressions in the ground as well as moving upwardly where raised portions are encountered. The flexible membrane 48 of the accumulator moves or flexes in response to movement of the pistons of the cylinder units 24, whereby the accumulator maintains a substantially constant pressure of the fluid supporting the platform.

What is claimed is:

1. In a harvesting machine having a frame and a crop harvester platform movably mounted on said frame for travel along the ground during a crop harvesting operation, wherein the improvement comprises:

hydraulic ram means connected between said frame and said plaftorm for moving and supporting said platform;

a fluid reservoir;

a pump arranged to draw fluid from said reservoir for delivery to said ram means;

a manually operable control valve connected in fluid communication between said pump and said ram means in a first circuit for raising and lowering said platform when said control valve is disposed in first and second positions respectively;

a second circuit in fluid communication with said control valve when said control valve is disposed in a third position, said second circuit including a check valve disposed in fluid communication with said ram means for maintaining a predetermined fluid pressure in said ram means for floatably supporting said platform, said second circuit further including valve means operative in response to said predetermined pressure to direct fluid flow from said pump to said reservoir, thereby preventing fluid flow into said ram means after said predetermined pressure has been attained.

2. The subject matter of claim 1, including accumulator means in fluid communication with said ram means for accommodating fluid flow into and out of said ram means as said platform moves along ground undulation.

3. The subject matter of claim 1, including spring means biasing said control valve into its third position from both of said first and second positions, whereby said second circuit is automatically effective in response to the completion of the raising or lowering said platform.

4. A hydraulic system for supporting a ground-engaging crop harvester platform relative to the frame of a harvesting machine, comprising:

a fluid reservoir;

a pump arranged to draw fluid from said reservoir;

hydraulic ram means operably connected between said frame and said platform and arranged to receive pressure fluid from said pump;

a control valve operatively associated with said ram means for raising and lowering said platform when said control valve is manually disposed into first and second positions respectively;

check valve means arranged to admit pressure fluid into said ram means and maintain the fluid therein at a predetermined pressure when said control valve is disposed into a third position; and a pressure responsive unloading valve arranged to direct fluid to said reservoir from said control valve in its third position in response to said predetermined pressure, thereby preventing fluid flow into said ram means after said predetermined pressure has been attained.

5. The subject matter of claim 4, including means biasing said control valve into its third position from both of said first and second positions.

References Cited
UNITED STATES PATENTS 3,509,701  5/1970  Clarke _____ 56—208

ANTONIO F. GUIDA, Primary Examiner

U.S. Cl. X.R.

56—10.2, DIG 15